UNITED STATES PATENT OFFICE.

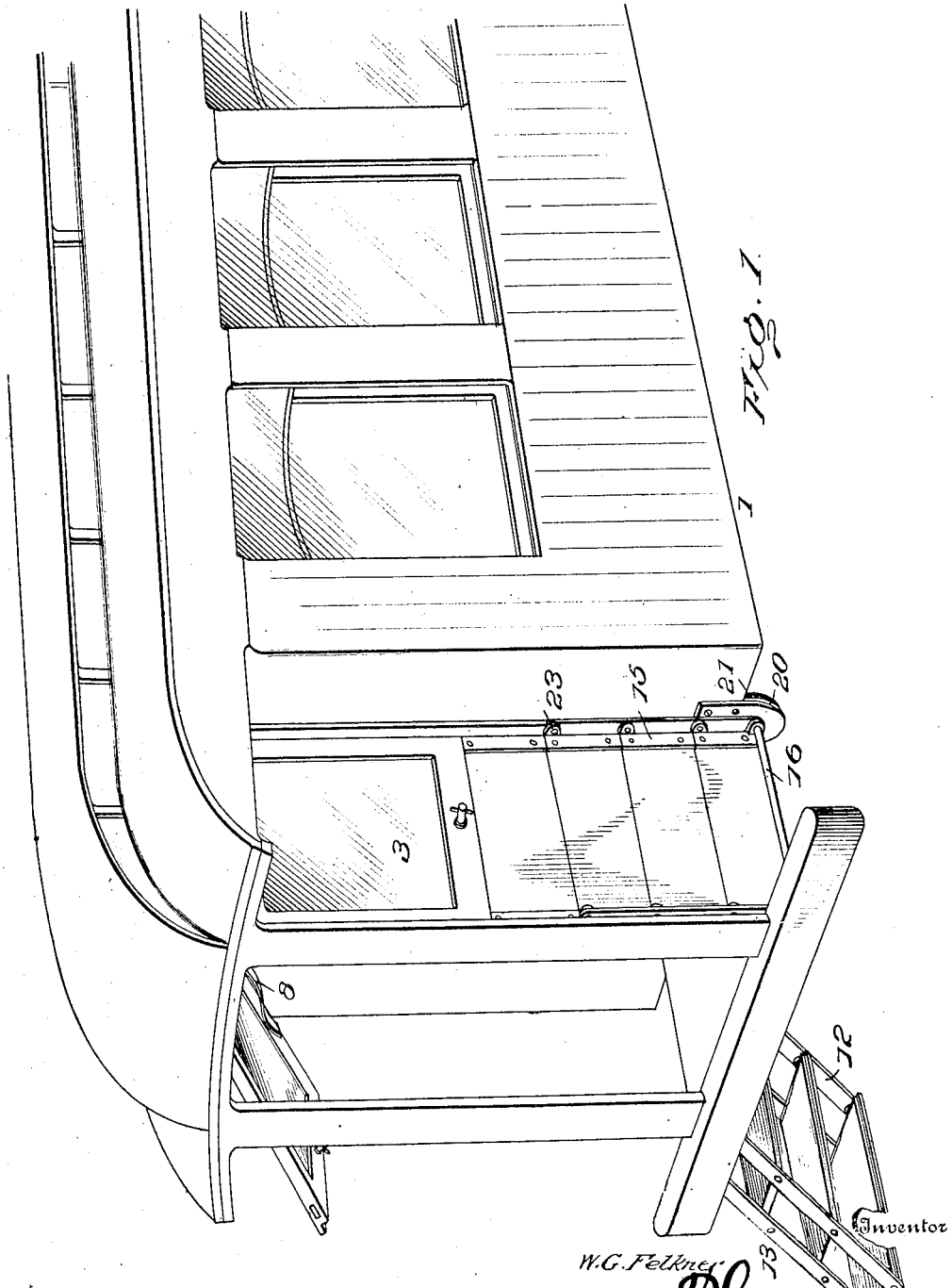

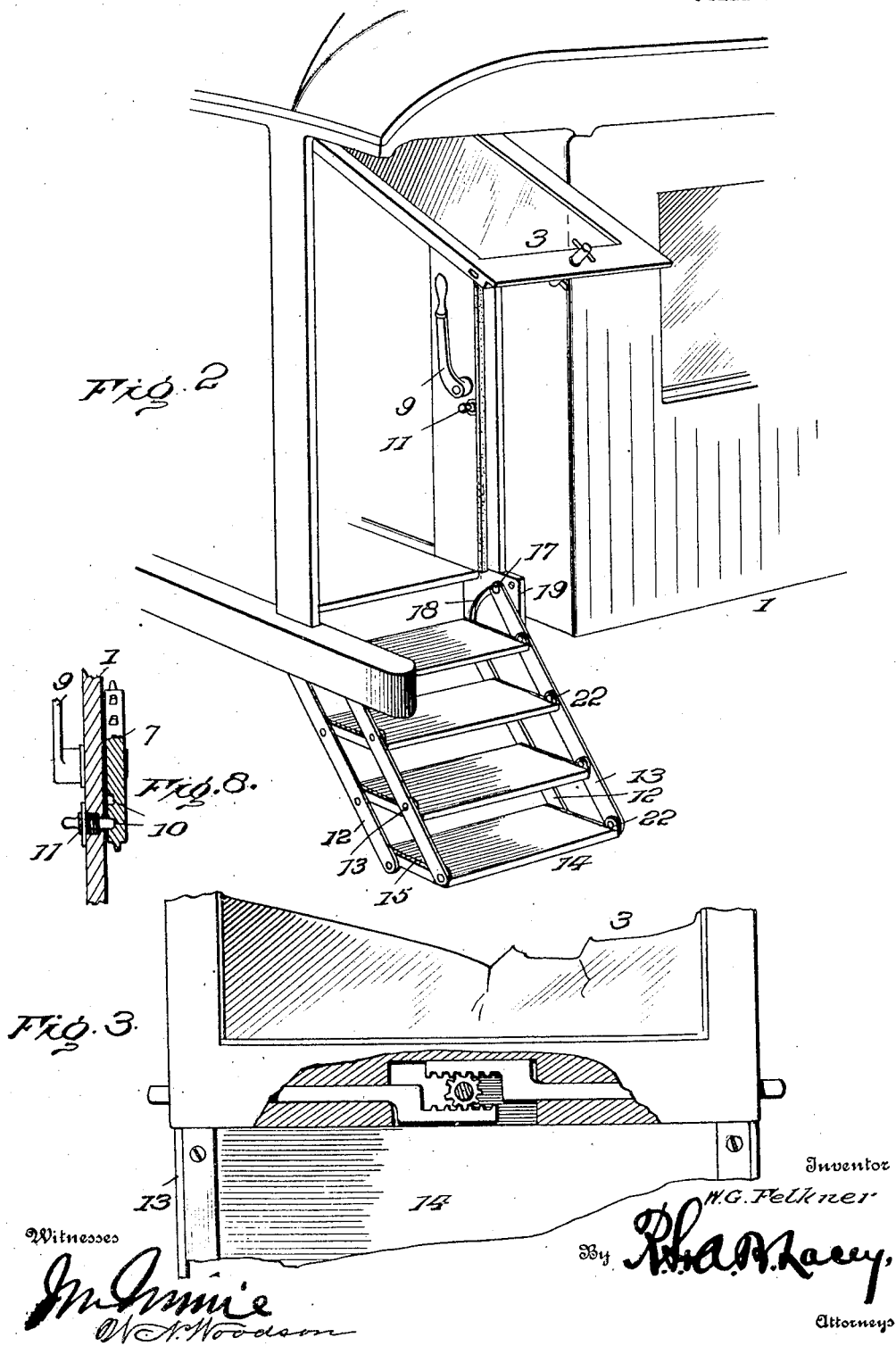

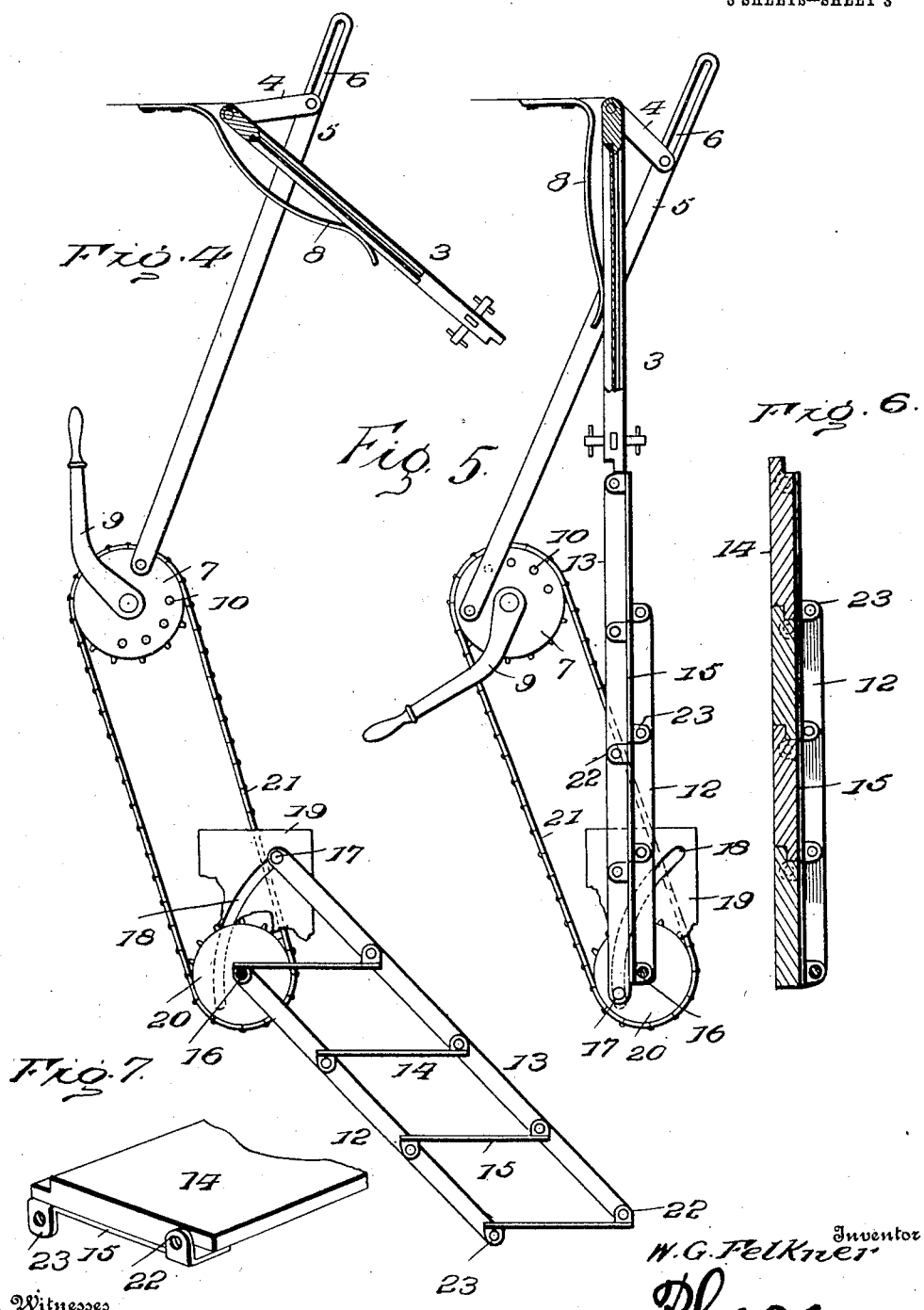

WILLIAM G. FELKNER, OF SEBREE, TEXAS.

FOLDING CAR-STEP.

No. 869,429.      Specification of Letters Patent.      Patented Oct. 29, 1907.

Application filed February 6, 1907. Serial No. 356,094.

*To all whom it may concern:*

Be it known that I, WILLIAM G. FELKNER, a citizen of the United States, residing at Sebree, in the county of Jack and State of Texas, have invented certain new and useful Improvements in Folding Car-Steps, of which the following is a specification.

This invention appertains to steps for public carriers or vehicles such as cars, the purpose being to devise a structure which will admit of the steps folding into an upright position to form a guard or closure to prevent a passenger from entering or leaving the car or vehicle after the steps have been elevated into a folded position.

The invention also has for its object to combine with the steps novel actuating means to positively effect the folding and unfolding thereof, and which means are adapted to be under control of the operator so as to be easily and conveniently manipulated when required either to lower the steps or to elevate the same.

A further purpose of the invention is to combine with the steps a swinging panel or closure which in conjunction with the steps completely closes the opening through which exit or entrance is had from and into the vehicle, said closure or panel being operable by means of the said actuating mechanism or adapted to be moved independently thereof should it be required to open the same for ventilation or other cause.

For a full description of the invention and the merits thereof and also to acquire a knowledge of the details of construction and the means for effecting the result, reference is to be had to the following description and accompanying drawings, in which:

Figure 1 is a perspective view of the end portion of a car provided with folding steps embodying the invention, the steps upon one side being elevated or folded and the steps upon the opposite side lowered. Fig. 2 is a detail perspective view of the corner portion of a car showing the steps upon the inner side lowered. Fig. 3 is a detail view of the panel or closure operating in the door way above the steps showing more clearly the means for locking said panel when closed. Fig. 4 is a detail view of the steps, swinging panel or closure and the actuating means therefor showing the relation of the parts when the steps are lowered and the panel swung open. Fig. 5 is a view of the parts shown in Fig. 4 showing their relation when the steps are folded or elevated and the panel closed. Fig. 6 is a sectional view of the steps as they appear when folded showing the treads lying in the same plane. Fig. 7 is a detail perspective view of an end of a tread showing the metal support fitted thereto. Fig. 8 is a sectional view showing the catch coöperating with the crank wheel to hold the steps in an adjusted position.

Corresponding and like parts are referred to in the following description and indicated in all the views of the drawings by the same reference characters.

While the invention is of such nature as to be readily adapted to any style or variety of vehicle or car which is illustrated in the accompanying drawings attached to a vestibule car of which 1 represents the platform at the end and having steps at each side to admit of ingress and egress at either side of the car according to the position of the platform at the station. A door way 2 is provided at each end or side of the platform 1 in the usual manner, and this door way is adapted to be closed by the steps and by means of a panel 3, the latter being arranged to swing outward at its lower edge and adapted when closed to be fastened by suitable catches arranged to engage with the jambs at the sides of the door way. A crank arm 4 is connected with the upper end of the panel or closure 3 and has a limited sliding connection with the upper end of a bar or rod 5, the same having a slot 6 in which the crank portion of the crank arm operates. The lower end of the bar or rod 5 has eccentric connection with a crank wheel 7 and derives motion therefrom to effect positive opening and closing of the panel 3 according as the steps are lowered or elevated. The slot 6 in the upper portion of the bar or rod 5 admits of the panel or closure 3 being opened at any time to secure ventilation or for any other purpose. A spring 8 coöperates with the panel or closure 3 to hold the same open when its catches are disengaged from the jambs of the door way. The crank wheel 7 may be conveniently located and is concealed in the end of the car and is provided with an operating handle 9. A series of openings 10 are formed in an edge portion of the crank wheel and coöperate with a lock bolt 11 to hold the steps in the required adjusted position. The lock bolt 11 may be of any structural type and when shot into any one of the openings 10 prevents rotation of the crank wheel in either direction hence it holds the steps fixed in the required adjusted position.

The folding steps comprise side bars 12 and 13, treads 14 and tread supports 15. The bars 12 are secured at their upper ends to a shaft 16 so as to move therewith. The bars 13 are movable towards and from the respective bars 12 and at the same time receive a pivotal movement with said bars 12 when raising or lowering the steps. Lateral projections 17 are provided at the upper ends of the bars 13 and operate in cam ways 18 so arranged at to effect folding and unfolding of the treads simultaneously with the raising and lowering of the same. The cam ways 18 are formed in plates 19 attached to opposite sides of the jambs or parts bordering upon the door way 2 and in which plates the shaft 16 attains bearings. The edges of the treads are rabbeted so that when the steps are raised they meet and form a scarf-joint thereby excluding wind and rain in stormy and inclement weather. The parts are so arranged that when the steps are turned into vertical position, the treads 14 lie in the same plane and form a guard or closure for the door way 2. The lateral projections 17 preferably consist of rollers mounted upon studs so as to reduce the friction to the smallest amount possible between the cam ways 18 and the parts of the bars 13 coöperating therewith to effect movement of the treads simultaneously when turning of the steps towards and from the perpendicular.

A wheel 20 is fast to an end portion of the shaft 16 and is connected to the crank wheel 7 by means of an endless belt 21 the same being permanently connected at points to the crank wheel 7 and the wheel 20 to cause simultaneous rotation of both wheels upon operating the handle 9. The wheels 7 and 20 are preferably grooved in their peripheries and the endless belt 21 consists of a cable or chain fitted in said peripheral grooves and attached to the respective wheels 7 and 20 in any convenient way to cause simultaneous movement thereof.

While the treads 14 may be pivotally connected to the respective bars 12 and 13 in any manner, yet it is preferable to employ the supports 15 which consist of a plate having an upwardly extended ear 22 at one end and a downwardly extending ear 23 at the opposite end and which ears are pivotally connected to the respective bars 13 and 12. The tread supports are secured to the lower or outer sides of the treads 14 thereby admitting of the latter being formed of wood, the same being prevented from warping and being firmly pressed by the said supports 15 as will be readily comprehended.

When the steps are elevated and folded they form a guard or closure for the lower portion of the door way 2, the upper portion of said door way being closed by the panel 3. The outer edge of the lowermost tread and the lower edge of the panel or closure 3 are elevated to form a scarf-joint or to close tightly in any manner it being preferred to have a portion of the panel or closure 3 overlap a portion of the steps so that the panel when secured by the fastening means applied thereto may serve to hold the steps in elevated position. By reason of the sliding connection between the crank arm 4 and the bar or rod 5, the panel or closure 3 may be opened at any time without necessitating movement of the steps the connection is such that upon lowering the steps the panel or closure 3 is swung outward at its lower edge to provide ample space for ingress and egress. The panel or closure 3 and the steps occupy substantially the same vertical plane when the door way 2 is closed and effectually close said door way and exclude wind, rain and the like.

Having thus described the invention, what is claimed as new is:

1. Folding steps comprising corresponding pairs of side bars and treads, corresponding side bars of the pairs being pivoted, and cam ways coöperating with the other bars of said pairs to effect movement of the treads as the steps are raised and lowered by a turning movement about a given axis.

2. In folding steps, the combination of pairs of side bars, treads having pivotal connection at or near their edges with the respective side bars and having their edges matched to form close joints when the steps are raised and the treads are brought into the same plane with their edges matching, means pivotally supporting a set of side bars and cam ways coöperating with the other set of side bars to effect opening and closing of the treads simultaneously when raising and lowering of the steps or a pivotal movement.

3. In combination, folding steps arranged to form a vertical closure for the lower portion of a door way when raised, and a movable panel adapted to close the upper portion of said door way and in conjunction with the folding steps to completely close the said door way.

4. In combination folding steps arranged to form a vertical closure for the lower portion of a door-way, a movable panel adapted to close the upper portion of said door-way and in conjunction with the folding steps to completely close the said door-way, securing means between the panel and the door frame to hold said panel in closed position, and interlocking means between the panel and steps to hold them in fixed position.

5. In combination, folding steps adapted to swing into vertical position and close the lower portion of a door-way, actuating means for effecting folding and unfolding of said steps, a swinging panel for closing the remaining portion of the door-way and connecting means between said panel and the said actuating means to effect simultaneous movement of the steps and panel.

6. In combination, folding steps adapted to close a portion of a door way, actuating means for effecting folding and unfolding of said steps, a panel for closing the remaining portion of the door way, connecting means between said panel and the said actuating means whereby the steps and panel may be simultaneously operated, the means connecting said panel with the said actuating means have a limited play to permit of said panel being opened at any time without affecting movement of the said steps.

7. In combination, folding steps, a manually operable wheel connected with said steps to effect raising and lowering thereof and having a series of openings in a side thereof, and a lock bolt for securing said manually operable wheel in an adjusted position against movement in either direction to fix the position of the steps when opened to any desired point.

8. In combination, a vehicle provided with a door way, folding steps affording ingress and egress through said door way and adapted when elevated to close the lower portion of said door way, a panel arranged to close the upper portion of said door way and to swing outward at its lower edge, and actuating means for effecting simultaneous movement of the steps and panel, said actuating means having a limited play with reference to the connection of said panel therewith to provide for the opening of said panel when the steps are closed without necessitating movement of said steps.

9. In combination, a vehicle provided with a door way, folding steps adapted to close the lower portion of said door way, a shaft having the steps connected therewith, a wheel fast to said shaft, a manually operable wheel, and an endless belt connecting the two wheels to effect opening and closing of the steps by a pivotal movement.

10. In a vehicle provided with a door way, the combination of folding steps adapted to close the lower portion of said door way when raised, a shaft having the steps connected thereto, a wheel fast to said shaft, a crank wheel, connecting means between the crank wheel and the wheel fast to the shaft supporting said steps, a swinging panel adapted to close the upper portion of the door way above the steps when the latter are raised, and connecting means between said panel and the crank wheel to admit of simultaneous movement of the steps and panel, said connection having a limited play to admit of opening the said panel when the steps are closed without necessitating movement thereof.

In testimony whereof I affix my signature in presence of two witnesses.

WILLIAM G. FELKNER.

Witnesses:
 JOSEPH ROTH,
 P. L. HUDDLESTON.